A. J. HALL.
AXLE SPINDLE.
APPLICATION FILED MAR. 23, 1911.
1,086,166.
Patented Feb. 3, 1914.
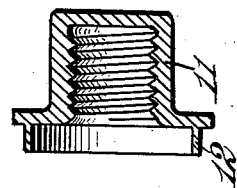
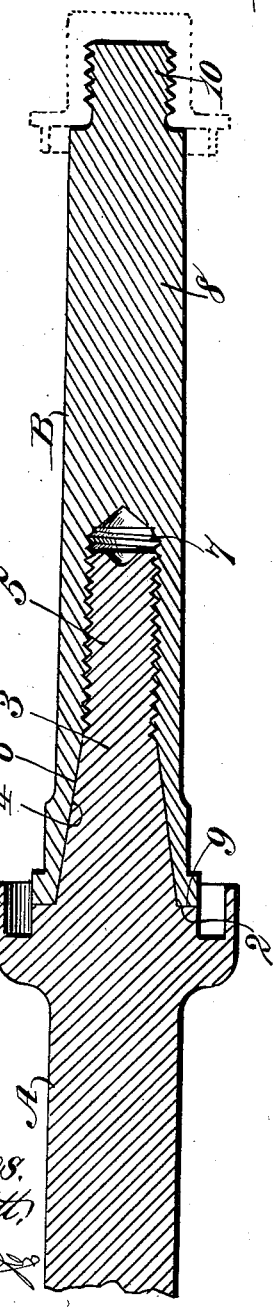
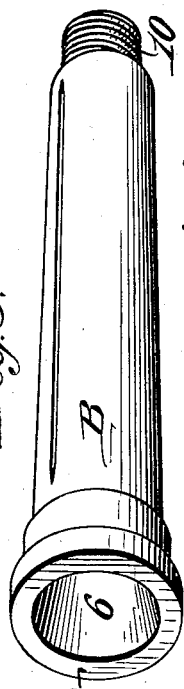
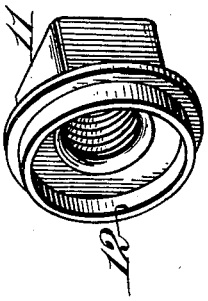
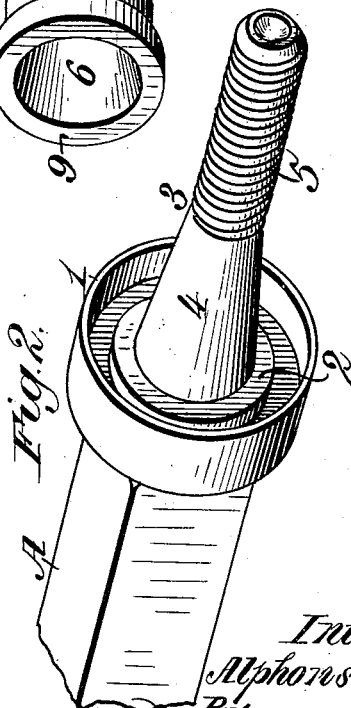
Witnesses.
Inventor:
Alphonso J. Hall.

UNITED STATES PATENT OFFICE.

ALPHONSO J. HALL, OF BIRMINGHAM, ALABAMA.

AXLE-SPINDLE.

1,086,166.  Specification of Letters Patent.  Patented Feb. 3, 1914.

Application filed March 23, 1911. Serial No. 616,435.

*To all whom it may concern:*

Be it known that I, ALPHONSO J. HALL, a citizen of the United States, residing at Birmingham, in the county of Jefferson and State of Alabama, have invented new and useful Improvements in Axle-Spindles, of which the following is a specification.

This invention relates to improvements in axle spindles and it proposes a removable spindle having certain novel characteristics of construction and assemblage conducing to its adaptability to any type or weight of vehicle; to a degree of strength practically equal to that of a solid spindle; to ease of assemblage and disassemblage; and to simplicity and inexpensiveness.

An embodiment of the invention is illustrated in the accompanying drawings, wherein—

Figure 1 is a longitudinal sectional view showing the spindle fitted upon an axle: Fig. 2 is a perspective view showing the end construction of the axle; Fig. 3 is a perspective view of the spindle; and Fig. 4 is a perspective view of a retaining nut.

Similar characters of reference designate corresponding parts throughout the several views.

The axle proper is shown at A and the improved spindle at B. The axle A is formed with the usual dust guard 1, with a shoulder 2 concentric within the dust guard, and with a stem 3 which projects coaxially from the shoulder 2, the stem 3 having a smooth surfaced frusto-conical portion 4 adjacent the shoulder 2 and which tapers outwardly and having also a cylindrical threaded portion 5 which projects from the end of the frusto-conical portion 4. The stem 3 fits in a bore extending coaxially from the inner end of the spindle B and having its surface of an outline which conforms to that of the surface of the stem. The bore thus has an inwardly tapering smooth surfaced portion 6 extending from its inner end and a cylindrical threaded portion 7 extending coaxially from the tapering portion 6. It will be noted that the length of the bore is approximately only half of the length of the spindle whereby the outer portion of the spindle, as 8, is solid. The provision of the bore is thus without any weakening effect on the spindle. The spindle has at its inner end an annular shoulder 9 of the same diameter as the shoulder 2 and which abuts the latter, the shoulders 2 and 9 conjointly forming a collar. At the outer end of the spindle a reduced threaded extension 10 is provided to receive a hub retaining nut 11 provided with a dust ring 12.

The spindle is shown in assembled relation in Fig. 1. The threaded portions 5 and 7 obviously coact to draw the spindle and the axle together when the spindle is rotated in the proper direction. Thereupon the tapering faces 4 and 6 are brought into contact as well as the adjacent faces of the shoulders 2 and 9. The joint or connection between the axle and the spindle is of very strong character and for practical purposes is equal in strength to a solidly connected spindle and axle. The abutting shoulders 2 and 9 as well as the engaging faces 4 and 6 prevent any loose play and the stem 3 at the points where the greatest stress occurs is of a thickness which is amply sufficient to provide for the resistance of stresses. Furthermore the stresses occur at points within the smooth surfaced areas and cannot affect the engagement of the smooth faces, whereas at the points where the parts are positively connected, *i. e.* throughout the threaded areas there will be no substantial stresses and consequently no liability of stripping the threads or of otherwise endangering the security of the connection. By providing the thickened frusto-conical portion 4 and the threaded portion 5 projecting from the end of the portion 4 it is possible to secure the requisite strength and security of connection between the axle and the spindle without at all weakening the latter. This is for the reason that it is necessary to make the bore of the spindle only approximately half of the length of the latter whereby the outer end half of the spindle is solid and consequently has a degree of strength equal to that of any ordinary solid spindle.

The assemblage and construction of the spindle is furthermore of such nature that it can be used in connection with any existing type of vehicle, light or heavy, and without interference with the dust guards or rings ordinarily employed. The wheel may be fitted on or removed without any manipulation of the spindle or without adjustment or removal of any parts other than the nut 11 and the assemblage and removal of the spindle may be accomplished with equal facility, all that is necessary being to turn the spindle in the direction necessary for establishing or disestablishing the connection thereof with the axle.

The spindle may be manufactured at slight expense from a section of forged steel and such manufacture does not require the production of any extraneous parts such as clamps, sleeves, and the like.

Having fully described my invention, I claim:

1. The combination of an axle having at its end an axially projecting stem formed with a frusto-conical outwardly tapering smooth surfaced portion immediately adjacent the body of the axle and with a threaded cylindrical portion projecting from the frusto-conical portion, a spindle having a bore extending approximately half its length from its inner end, the bore having a tapering smooth surfaced portion conforming to the frusto-conical portion of the stem and having a threaded portion conforming to the threaded portion of the stem, the outer end half of the spindle being solid and terminating in a threaded extension, and a hub retaining nut which is fitted on the extension.

2. The combination of an axle having at its end an axially projecting stem formed with a frusto-conical outwardly tapering smooth surfaced portion immediately adjacent the body of the axle and with a threaded cylindrical portion projecting from the frusto-conical portion, the axle also having an annular shoulder at the larger end of the frusto-conical portion, a spindle having a bore extending approximately half its length from its inner end, the bore having a tapering smooth surfaced portion conforming to the frusto-conical portion of the stem and having a threaded portion conforming to the threaded portion of the stem, the spindle also having at its inner end an annular shoulder adapted to abut against the annular shoulder aforesaid, the outer end half of the spindle being solid and terminating in a threaded extension, and a hub retaining nut which is fitted on the extension.

3. The combination of an axle having at its end an axially projecting stem formed with a frusto-conical outwardly tapering smooth surfaced portion immediately adjacent the body of the axle and with a threaded cylindrical portion projecting from the frusto-conical portion, the axle also having an annular shoulder at the larger end of the frusto-conical portion and a dust ring concentric to the shoulder, a spindle having a bore extending approximately half its length from its inner end, the bore having a tapering smooth surfaced portion conforming to the frusto-conical portion of the stem and having a threaded portion conforming to the threaded portion of the stem, the spindle also having at its inner end an annular shoulder adapted to abut against the annular shoulder aforesaid, the outer end half of the spindle being solid and terminating in a threaded extension, and a hub retaining nut which is fitted on the extension.

In testimony whereof I have hereunto set my hand in presence of two subscribing witnesses.

ALPHONSO J. HALL.

Witnesses:
W. L. METCALFE,
JNO. B. MCCOY.

---

Copies of this patent may be obtained for five cents each, by addressing the "Commissioner of Patents, Washington, D. C."